D. STEINER.
MILLING CUTTER.
APPLICATION FILED DEC. 21, 1909.
991,463.
Patented May 2, 1911.
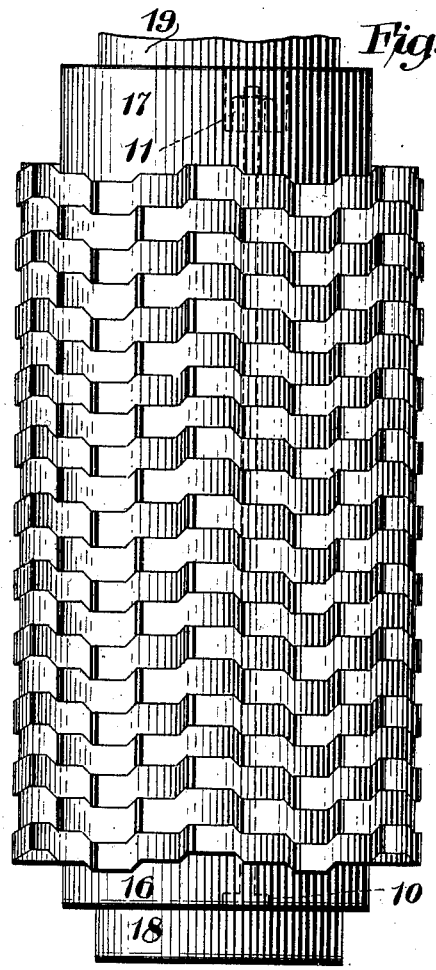
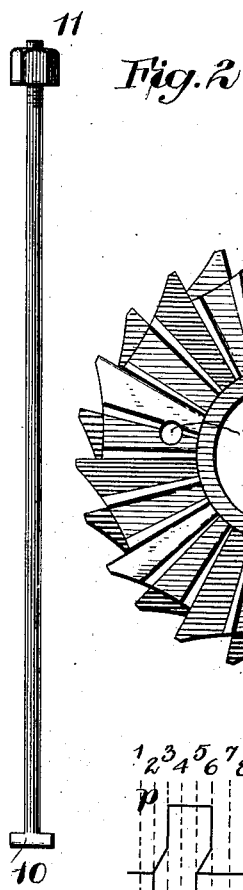
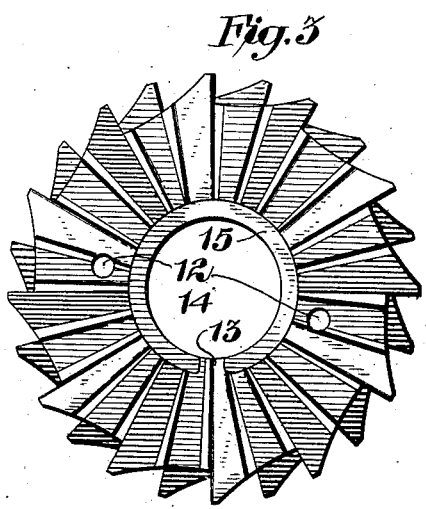
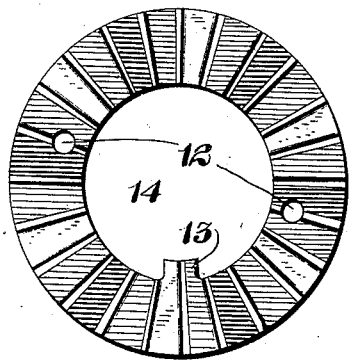
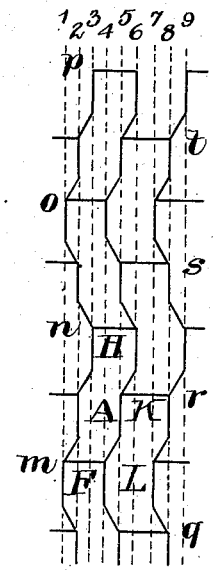
Witnesses—
Walter Chism
Wills A. Burrows
Inventor—
Diethelm Steiner
by his Attorneys—
Howson & Howson

UNITED STATES PATENT OFFICE.

DIETHELM STEINER, OF PHILADELPHIA, PENNSYLVANIA.

MILLING-CUTTER.

991,463. Specification of Letters Patent. Patented May 2, 1911.

Application filed December 21, 1909. Serial No. 534,393.

*To all whom it may concern:*

Be it known that I, DIETHELM STEINER, a citizen of the Republic of Switzerland and a citizen intent of the United States, resident of Philadelphia, Pennsylvania, have invented certain Improvements in Milling-Cutters.

The principal improvement of my invention results in a longer life for the expensive spindles, upon which milling cutters operate; also in a greater and more accurate production of work.

The following is a specification of my improvements; which consists of a milling cutter being built in sections, for the purpose of less expensive construction, but mainly to receive interrupted rows of teeth, with reduced faces or attacking edges, that have the necessary durability, for more exact and increased capacity of work, which is my purpose in view; less strain between working material and cutter in my improvement insures a more accurate line of cut, besides a saving to the spindles, and I find also in my combination of arrangements, greater economical usage for the tool in question. These things are done by having the adjoining shoulders of the different cutter sections corrugated, that is, impressed in a manner allowing every other tooth in a cutter part left out, and the remaining teeth extending left and right into the paths of their neighbor sections. This meets at once the desired conditions: First: The corrugated shoulders add strength to those single units of which my cutter is composed, permitting them to be made at reduced thickness, thus increasing the number of teeth which means the possible least attacking but more separating edge, since each tooth attacks from the front only and separates from the sides. The effectiveness of such an attack increases, as the front of the tooth diminishes; and is further helped by the thus more numerous separating edges on the sides of the teeth, which cause to lessen the tension between working material and cutter; the latter will now find it easier to follow the line of cut, hence, the greater quantity and quality of work. For it must be remembered that when a cutter attacks the material readily, without need of that intense strain between them, not only follows the line of cut more promptly, but gains speed, and also saves time in not having to go over a bad cut, and additionally this brings about the comparative lesser strain upon the operating spindle, and other advantages which are mentioned later on.

In the accompanying drawing, Figure 1, is a horizontal elevation of my improved cutter, attached to a spindle partly seen on top and bottom of Fig. 1. The different cutting plates are embraced by two collars, (see Fig. 4, also 16 and 17 Fig. 1) the shoulders of these collars, adjoining the two respective end cutting disks, are molded like the latter for snug fit and gripping purpose. Said collars (16 and 17) are connected together and with the cutter plates, by two or more slender bolts (see Fig. 2 and dotted line indications 10 and 11 in Fig. 1) which point out that the ends of said bolts are countersunk into the collars to leave the surfaces of the latter smooth, so as not to interfere when the cutter is fastened good and tight between spindle shoulder 19 and spindle nut 18 (Fig. 1) ready for work. There are, of course, suitable holes through all sections of the cutter for the reception of these bolts, which are kept close to the central opening, allowing the plates to be recut. (See 12 in Figs. 3 and 4.) The intention of this arrangement of bolts and collars is simply for means of keeping and handling the various parts of the cutter compact when not on the spindle, but especially for accommodation of grinding all the disks together whenever they are dull. This style of cutter is resharpened in the same way like the old fashioned one, after inserting a suitable bushing through the center bore (see 15 in Fig. 3), this figure being a top or plan view of two cutter plates lying one upon the other. In the usual center bore 14 which is for the reception to the spindle, I have a key lug 13, instead of a key way for the understood purpose, on each plate; this rather increases their strength, while a key would diminish it. Each cutting disk having such a key lug, the pressure upon the operating spindle is equally divided, which is not the case with an almost invariably short key commonly used for all sizes of cutters. This evenly divided strain upon the spindle is further enhanced inasmuch as the corrugated shoulders embracing one the other helps to share an uneven or greater strain upon any one section of the cutter, this helping to strengthen not only the spindle, but the individual plates themselves. In addition, I also provide the collars 16 and 17 with such key lugs (Fig. 4, 13) to assist the outer cutting disks, so they all are equally supported.

In Fig. 3 (top plate) it will be noticed that every other tooth is left out, as it were, and then the teeth of the under plate take the places opposite these omissions. I have simply repeated this operation in the elevation shown in Fig. 1, and thus a cutter of any size may be built up. Therefore, this interchange of a regularly broken circle of teeth opposite the omission of an equally interrupted plate of teeth is the most simple and cheapest way of creating an interrupted toothed cutter, or a cutter whose rows of teeth are toothed again. The importance of an interrupted toothed cutter, with its more effective attack, I have already explained.

Fig. 5 represents the face space of two plates divided into parts, indicated by dotted lines. This is an illustration of how the cutting disks are corrugated, so their interrupted circles of teeth may reach beyond the joints of the plates next to them, in order to produce and cut a clean surface, besides giving strength and stability to one another. It will be noticed the left plate F. A. H., indicated by solid lines, recedes twice from dotted line 1, or height F. into A, or dotted line 2, and then into depth H., or beyond dotted line 3, and from here back to the original height F. This is repeated all around the circle. The solid line to the right of plate F. A. H., which is also the joint and left side of the plate I. K. L., runs parallel with the first solid line to the left of F. A. H. Thus every plate has the same shoulder corrugations and it will be easily perceived that these impressions may be made to follow one another in square or either slanting to dotted line 1. But to my mind it is preferable to use only the straight rows of teeth that are in square to the revolving direction, because the pressure thus exerted upon the material by the cutter is in harmony with its own movement and the one of the machine table, while a slanting row of teeth with its doubled directed force, forward and downward, especially when acting upon out of alinement material of a big radius will shake the table with disintegrating vibrations all around. The diminished cutting edges do away with the need of a slanting attack of cut. As it is useless to have more corrugations and depths of such shoulder impressions than is needed to get the desired combination of disks, which form interrupted rows of teeth clearing one another's paths, therefore, I use in preference and for a uniform method in the interest of expense this two height and depth system of corrugation, as the least complicated.

It will be noticed in Fig. 5 opposite M. N. O. P. and Q. R. S. T. are short cross lines indicating teeth, there is always a tooth on the edge of a corrugation, then comes an omission on the next edge. On the adjoining plate the teeth are opposite the omissions of the first plate. It will further be noticed that the teeth on the left plate F. A. H. are all either on the extreme left, between dotted lines 1 and 6, while on the right plate I. K. L. all the teeth are on the middle corrugation or between dotted lines 5 and 8. Thus it will be understood that all teeth transgress in travel upon the paths of others, and so clean up all joints. Now I would draw attention to the corrugations back of the lines of teeth, where they run straight with and in the direction of the revolving line, each shoulder clearing itself; from here they connect with the next impression, by preference I use the straight or washer connection. It will be noticed (see Fig. 5) the attacking edges, $m$, $n$, $o$, $p$, $q$, $r$, $s$, $t$ of the teeth are in square to the revolving direction and their own shoulders; further do the corrugations of the cutter sections break and succeed one another along the cutting lines which form the rows of teeth; also do the bolts (Fig. 2) extend in the direction of their nearest row of teeth, likewise do all the key logs and also the key way in the spindle form themselves in a parallel course to the row of teeth closest by. This enables one to exchange any plate for any other corresponding one in the cutter, which is a great saving to the tool, because very seldom the whole face of a cutter is used, and often a very small place gets badly burned. In the old system the whole tool has to be ground down, or even recut. In my cutter a damaged part may be exchanged, and thus most all plates may be dulled before the cutter is resharpened. For example, on certain classes of work a cutter as long as the width of the piece operated on has hitherto necessarily been required, and while perhaps less than one half of the tool was used, its whole face had to be resharpened, thus wasting material and labor, especially if one part should get damaged or burned. In my system a comparatively shorter cutter may be used by parting the same with a common bushing, which will be readily comprehended. And furthermore, the many projecting teeth in my cutter make the cooling fluid linger longer on them than on an ordinary cutter, and thus become more effective in preventing friction heat.

Having thus described my invention, I claim and desire to secure by Letters Patent:—

1. A milling cutter consisting of a series of toothed disks assembled to provide interrupted rows of teeth, the teeth of each disk being opposite the spaces between and projecting into the paths of movement of, the teeth of a disk adjacent to it; with means for holding the disks together.

2. A milling cutter consisting of a series of radially corrugated toothed plates; and means for holding the plates together with their teeth in interrupted rows, the teeth of certain of the plates overlapping the paths of movement of the teeth on others of the plates.

3. A milling cutter consisting of two sets of toothed plates each having its sides radially corrugated to provide surfaces at three different levels, one set of plates having teeth at its parts of extreme deflection and the other set of plates having teeth at parts intermediate those of extreme deflection; with means for holding the disks together.

4. A milling cutter composed of more than two disks assembled with the teeth of each disk opposite the spaces between the teeth of the adjacent disk or disks to provide a plurality of interrupted rows of teeth, said disks being formed to provide shoulders for the teeth at points between the teeth of an adjoining disk or disks; with means for holding the disks together.

5. A milling cutter composed of a series of radially corrugated toothed disks arranged with the teeth of each disk overlapping the path of movement of the teeth of an adjoining disk; and the teeth of the cutter lying in interrupted rows; the metal of each disk being laterally displaced to lie in more than two levels and the distance between the two extreme levels being substantially two-thirds of the thickness of said disk, the teeth of every other disk being formed on the periphery of the extreme levels thereof and the teeth of the other disks being formed on the periphery of an intermediate level thereof; with means for holding the disks together.

6. A milling cutter consisting of a shaft; and a series of disks keyed thereon, each of said disks having a cutting edge and sides with alternating projections and recesses, the projections on each disk fitting into and locking with the recesses of the succeeding disk, and means to bind said disks to hold them against separation axially of the shaft.

In testimony whereof I sign my name to this specification in the presence of two subscribing witnesses.

DIETHELM STEINER.

Witnesses:
MARTHA HANNAH MONKHOUSE,
MAE LEVY.

Copies of this patent may be obtained for five cents each, by addressing the "Commissioner of Patents, Washington, D. C."